(12) United States Patent
Martin

(10) Patent No.: US 7,476,333 B2
(45) Date of Patent: Jan. 13, 2009

(54) COMPOSITION AND METHOD FOR REDUCING CHEMICAL OXYGEN DEMAND IN WATER

(75) Inventor: Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 260 days.

(21) Appl. No.: 11/158,676

(22) Filed: Jun. 22, 2005

(65) Prior Publication Data

US 2006/0293177 A1    Dec. 28, 2006

(51) Int. Cl.
*C01B 15/08* (2006.01)
*C01B 11/00* (2006.01)
*C02F 1/72* (2006.01)
*C02F 1/76* (2006.01)
*C02F 1/68* (2006.01)

(52) U.S. Cl. ............... 252/186.33; 252/186.21; 252/186.27; 252/186.32; 252/186.34; 252/186.35; 252/186.36; 252/187.1; 252/187.23; 252/187.24; 252/187.27; 252/187.28; 210/759; 210/763

(58) Field of Classification Search ............. 252/186.27
See application file for complete search history.

(56) References Cited

U.S. PATENT DOCUMENTS

| | | | | |
|---|---|---|---|---|
| 3,532,634 A * | 10/1970 | Woods | ............................ | 8/111 |
| 3,577,490 A * | 5/1971 | Welsh et al. | ................. | 264/120 |
| 4,492,618 A | 1/1985 | Eder | ........................... | 205/701 |
| 4,555,457 A * | 11/1985 | Dhanji | ........................ | 429/199 |
| 5,114,611 A * | 5/1992 | Van Kralingen et al. | | ........................................ 252/186.33 |
| 5,599,781 A * | 2/1997 | Haeggberg et al. | .......... | 510/220 |
| 6,004,510 A * | 12/1999 | Gilbert et al. | .................. | 422/29 |
| 6,139,769 A * | 10/2000 | Nestler | ................... | 252/186.39 |
| 6,409,926 B1 | 6/2002 | Martin | ........................ | 210/709 |
| 6,455,751 B1 * | 9/2002 | Hoffman et al. | ............ | 588/320 |
| 6,566,318 B2 * | 5/2003 | Perkins et al. | ............... | 510/310 |
| 6,863,830 B1 * | 3/2005 | Purdy et al. | .................. | 210/756 |
| 7,090,820 B2 * | 8/2006 | Martin | ........................ | 423/513 |
| 7,255,797 B2 * | 8/2007 | Martin | ........................ | 210/754 |
| 2005/0035066 A1 * | 2/2005 | Martin et al. | ................ | 210/753 |
| 2005/0155936 A1 * | 7/2005 | Martin et al. | ................ | 210/754 |
| 2006/0013750 A1 * | 1/2006 | Martin et al. | ................ | 422/241 |
| 2006/0013751 A1 * | 1/2006 | Martin et al. | ................ | 422/241 |
| 2006/0078584 A1 * | 4/2006 | Lightcap et al. | ............. | 424/405 |
| 2006/0205626 A1 * | 9/2006 | Gant et al. | ................... | 510/367 |
| 2006/0293178 A1 * | 12/2006 | Martin | ........................ | 502/321 |
| 2006/0293179 A1 * | 12/2006 | Martin | ........................ | 502/321 |
| 2007/0193958 A1 * | 8/2007 | Martin | ........................ | 210/749 |

* cited by examiner

*Primary Examiner*—Joseph D Anthony

(57) ABSTRACT

A method and composition for reducing chemical oxygen demand is presented. The composition includes a persulfate donor and a transition metal catalyst in contact with the persulfate donor. When the composition is contacted by water, the transition metal catalyst reacts with persulfate and reduces the persulfate concentration in the water. The composition allows the use of persulfate, which is known to cause irritation to users of aquatic facilities (e.g., pools, spas) that come in contact with it. As the persulfate concentration is reduced rapidly in the water by the catalyzed reaction, the persulfate-containing cleaning product may even be used while the aquatic facilities are being used. Optionally, a free halogen donor may be incorporated into the composition. The composition may be in the form of powder, granules (coated or uncoated), or agglomerate.

5 Claims, No Drawings

COMPOSITION AND METHOD FOR REDUCING CHEMICAL OXYGEN DEMAND IN WATER

FIELD OF INVENTION

This invention relates generally to cleaning an aquatic facility and more particularly to cleaning an aquatic facility that contains organic contaminants.

BACKGROUND

Aquatic facilities such as swimming pools and spas have become increasingly popular in private homes, hotels, fitness centers, and resorts. To ensure that the aquatic facilities can be enjoyed safely, the water must be treated to reduce or eliminate chemical oxygen demands (COD) and/or total organic carbon (TOC). When the COD and/or TOC increases in the water, the oxidation reduction potential of the water decreases and oxidizers are added to maintain a healthy level of oxidation reduction potential. A common oxidizer that is used in aquatic facilities is chlorine or bromine. However, when chlorine or bromine is present in the water above a certain level in the presence of COD and/or TOC, trihalomethanes (THM) and chloramines form in the water undesirably.

Common ingredients for treating water systems include various persulfate salts and persulfate donors such as potassium monopersulfate (PMPS), which is typically available in the form of a triple salt, $(KHSO_5)_x \cdot (KHSO_4)_y \cdot (K_2SO_4)_z$ (herein referred to as "PMPS triple salt"). However, persulfate salts, such as potassium persulfate ($K_2S_2O_8$), are difficult to use because they cause severe irritation to facility users (e.g., swimmers, bathers) at concentrations above about 2 ppm. The strong oxidation potential of PMPS triple salt makes it effective for decreasing the concentration of COD. Typically, these chemicals are applied to the aquatic facility through a "shock treatment" whereby the facility is evacuated and the product is broadcast across the water surface. The facility users may not be allowed to come in contact with the treated water for a period of time after the treatment due to concerns for irritation.

PMPS usually contains potassium persulfate ($K_2S_2O_8$) as a result of being prepared using oleum. Persulfates have a long halflife in aquatic water facilities and are undesirable. As a result of the concerns for irritation resulting from accumulation of persulfate, PMPS can be used only at limited dosages, which typically do not exceed two pounds per 10,000 gallons of water per week.

While PMPS maintains the water quality in aquatic facilities reasonably well, it is not convenient to use because of the need to evacuate the facility during use and the fact that it can only be used in limited doses regardless of how heavily the facility is used. Thus, a way of cleaning the water without these inconvenient limitations is desired.

SUMMARY

In one aspect, the invention is a composition for reducing chemical oxygen demand in water. The composition includes a persulfate donor and a transition metal catalyst in contact with the persulfate donor, wherein the transition metal catalyst makes up between about 0.0001 wt. % and about 10 wt. % of the composition.

In another aspect, the composition includes a free halogen donor, a persulfate donor, and a transition metal catalyst. The free halogen donor, the persulfate donor, and the transition metal catalyst are agglomerated.

In yet another aspect, the invention is a method of removing chemical oxygen demand from water by maintaining a transition metal catalyst concentration level of between about 1 ppb and about 1 ppm of in the water and adding a persulfate donor to the water.

In yet another aspect, the invention is a method of removing chemical oxygen demand from water by preparing a persulfate solution, adding a catalyst to the persulfate solution, and feeding the persulfate solution to the water.

The invention is also a composition for removing chemical oxygen demand from an aquatic facility, wherein the composition includes: a transition metal catalyst in an amount that makes up between about 0.01 wt. % and about 10 wt. % of the composition, and a persulfate donor in an amount that makes up between about 90-99.99 wt. % of the composition.

DETAILED DESCRIPTION OF THE EMBODIMENT(S)

As used herein, a "persulfate donor" is any compound or composition that includes at least 0.5 wt. % $S_2O_8^{2-}$ donor, such as sodium persulfate, potassium persulfate, and PMPS (potassium monopersulfate) produced from oleum.

The invention discloses a composition and a method for removing the COD from aquatic facilities while the facility is being used by swimmers, bathers, etc. With the invention, the COD is decomposed as it is added to the water. Thus, the formation of THMs and chloramines is significantly reduced and the quality of air and water around the aquatic facilities is enhanced.

The invention allows the application of potentially irritating oxidants (e.g., potassium persulfate) while the water is being used by swimmers/bathers. Irritation to the bathers is avoided by using a catalyst that rapidly reacts with the persulfate to form sulfate free radicals. This rapid catalyzed reaction eliminates the concern of persulfate accumulation, and effectively decomposes the organic contaminants shortly after being added to the water, thereby preventing their accumulation.

The invention entails applying a catalyst to the water to maintain an "effective catalyst concentration," which is between about 1 ppb and about 1 ppm, more preferably between about 5 ppb and about 500 ppb. Then, a persulfate donor is added to the water, inducing the in-situ generation of sulfate free radicals through a catalyzed reaction. Sulfate free radicals have a reported potential of about 2.6 v.

When a low level of persulfate is applied to water in the presence of the catalyst, sulfate free radicals are formed that effectively decompose the organic compounds, as follows:

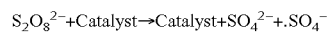

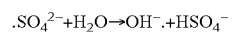

When the sulfate free radicals decompose the organic compounds, any sanitizer (e.g., free halogen donor) in the water is freed to effectively control the bacteria and viral counts.

The persulfate donor may be potassium monopersulfate, sodium persulfate, potassium persulfate, or any combination thereof.

The catalyst may be a transition metal donor, e.g. silver or copper ion donor. In some embodiments, the catalyst may also be cobalt, iron, molybdenum, platinum, or a combination thereof. A chelating agent may be included to prevent the precipitation of a catalyst. However, maintaining the pH of the water at between about 6.8 and about 8.0, and more preferably between about 7.0 and about 7.8, will effectively limit precipitation. The transition metal catalyst may make up between about 0.0001 wt. % and about 10 wt. % of the composition. In one exemplary embodiment, the transition metal catalyst constituted between about 0.01 wt. % and about 10 wt. % of the composition while the persulfate donor constituted between about 90 wt. % and about 99.99 wt. % of the composition.

The persulfate donor and the catalyst can also be combined with a free halogen donor. Free halogen donors act as effective sanitizer/oxidizer that rid the water of inorganic nitrogen such as mono- and di-chloroamines. Where free halogen donor is incorporated into the composition, the free halogen donor may make up between about 50-99 wt. % of the composition. The persulfate donor and the catalyst would make up about 1-50 wt. % of the composition. The catalyst alone may make up about 0.00001 wt. % to 10 wt. % of the composition.

The composition can be either a powder mixture, granular mixture, or agglomerate containing the persulfate donor and the catalyst. The composition of the invention effectively delivers the persulfate donor to the water while maintaining the effective catalyst concentration in the water.

To form the powder mixture, the catalyst is admixed with the persulfate donor in a container. To form the catalyst-coated granules, the persulfate donor may be prepared into granules and coated with the catalyst. The catalyst may be deposited on the surface of the granule uniformly or nonuniformly. In some embodiments, the coating may include a barrier film that isolates the persulfate donor from the surrounding environment (e.g., a free halogen donor). The persulfate-catalyst mixture or the catalyst-coated granules can be used as is or agglomerated using pressure to form a tablet made of a plurality of granules.

The agglomerates may contain an agent that restricts the dissolution rate of the agglomerate. Examples of such agents include a substantially water insoluble wax such as polyethylene wax, polyoxyethylene wax and their respective fatty acid ester wax. An agent can also be a mineral salt of a carboxylic acid having at least 16 carbons, such as calcium stearate and similar hydrocarbon based salts. Further still, the agent may be a gel-forming material such as a polaxamers, polyacrylic acid, polyacrylamide, polyvinyl alcohol, polysaccharides such as Xanthan, and various cellulose based derivatives. The gel-forming material forms a gelatinous structure upon being exposed to water, effectively controlling the rate at which the agglomerate dissolves in the water.

The composition can also be combined with a sanitizer such as trichloroisocyanuric acid. Chemical oxygen demand generally impedes the sanitizer from performing its function. When the composition removes the chemical oxygen demand, the sanitizer is able to effectively improve the water quality without impediment.

The composition may be used periodically to prevent the COD level in water from getting too high, it may also be used to recover aquatic facilities that are already highly contaminated with organic based COD.

EXAMPLE 1000 mL of a water-based stock solution containing 7.0 ppm persulfate was prepared by adding potassium persulfate (purchased from Sigma-Aldrich) to water and adjusting the pH to 7.2 using sodium bisulfate. The persulfate level was initially and periodically tested using ammonium thiocyanate and ferrous iron in an acidic solution. The stock solution was divided into 2-500 mL samples, and magnetic stirring rods were added to each sample. Using the magnetic stirrer, each sample was vigorously mixed to achieve a vortex reaching approximately half the distance to the stirring rod.

TABLE 1

Persulfate Decomposition Rate

| Lapsed Time (Hrs.) | Persulfate Conc. (ppm) with 0.63 ppm Ag catalyst | Persulfate Conc. (ppm) with 0.31 ppm Ag catalyst |
|---|---|---|
| 0 | 7.0 | 7.0 |
| 3 | 4.2 | 5.6 |
| 5 | 2.1 | 4.2 |
| 7 | <1.0 | 2.8 |

Table 1 shows that the persulfate concentration decreased with time. The test results in Table 1 illustrate that the catalyst, under conditions like those experienced in pools, can effectively decompose the persulfate irritant.

As the reactions proceed and the hydroxyl radicals are reduced, the pH of the solution increases. Therefore, during the test period, the pH was measured every 30 minutes and a solution of sodium bisulfate was administered as needed to maintain the pH at a range of about 7.2 to 7.5.

The test result indicates that when the reaction occurs in COD-laden water, the sulfate free radicals will enhance the effectiveness of the treatment (e.g., PMPS treatment) for decomposing the COD. Moreover, with the persulfate irritant being removed rapidly with the catalyst, the invention allows PMPS (which is usually accompanied by some persulfate) to be applied while swimmers and bathers are present in the water.

The composition, which is substantially soluble in water, may be made into a solution before being added to the COD-laden water. In some cases, the solution is prepared in a container before being delivered to the pool by an eductor system, a chemical metering pump, or pressure differential between the inlet and outlet water supply of the container. In other cases, the solution is made by adding the composition (e.g., in agglomerated form) to the circulating water of the system.

If desired, additional persulfate donor can be fed separately to the water to further enhance the formation of sulfate free radicals.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A dry composition for reducing chemical oxygen demand in water, the composition comprising:
   from about 90 wt. % to about 99.999 wt. % potassium monopersulfate; and
   a transition metal catalyst comprising cobalt, whereby when the dry composition is dissolved in water the composition results in the production of sulfate free radicals, and where the transition metal catalyst measured as elemental metal comprises from about 0.001 wt. % to about 10 wt. % of the dry composition.

2. A dry composition for reducing chemical oxygen demand in the water of an aquatic facility the composition comprising:
   from about 90 wt. % to about 99.999 wt. % potassium monopersulfate; and
   a transition metal catalyst comprising cobalt, whereby when the dry composition is dissolved in water the composition results in the production of sulfate free radicals, and where the transition metal catalyst measured as elemental metal comprises from about 0.001 wt. % to about 10 wt. % of the dry composition.

3. A dry composition for reducing chemical oxygen demand in water, the composition comprising:
from about 50-99 wt. % of a free halogen donor,
potassium monopersulfate; and
a transition metal catalyst comprising cobalt, whereby when the dry composition is dissolved in water the composition results in the production of sulfate free radicals and increased concentration of free halogen in the water,
where the transition metal catalyst measured as elemental metal comprises from about 0.00001 wt. % to 10 wt. % of the dry composition, and where the potassium monopersulfate and transition metal catalyst make up about 1-50 wt. % of the dry composition.

4. A dry composition for reducing chemical oxygen demand in the water of an aquatic facility the composition comprising:
from about 90 wt. % to about 99.999 wt. % potassium monopersulfate; and
a transition metal catalyst comprising cobalt and at least one of: copper, silver, iron, and manganese, whereby when the dry composition is dissolved in water the composition produces sulfate free radicals,
and where the transition metal catalyst measured as elemental metal comprises from about 0.001 wt. % to about 10 wt. % of the dry composition.

5. A dry composition for reduction of chemical oxygen demand in an aqueous facility, the composition comprising:
from about 50-99 wt. % of a free halogen donor,
potassium monopersulfate; and
a transition metal catalyst comprising cobalt and at least one of: copper, silver, iron, and manganese, whereby when the dry composition is dissolved in water the composition produces sulfate free radicals and increases the concentration of free halogen in the water,
where the transition metal catalyst measured as elemental metal comprises from about 0.00001 wt. % to 10 wt. % of the dry composition, and where the potassium monopersulfate and transition metal catalyst make up about 1-50 wt. % of the dry composition.

\* \* \* \* \*